Figure 1:
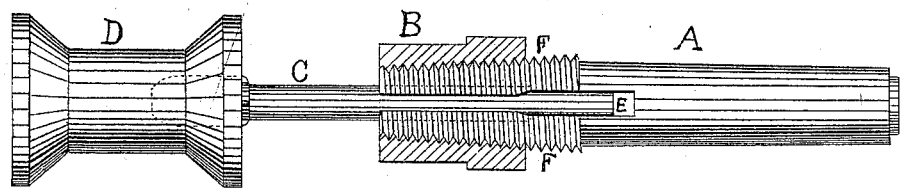
Figure 2:

J. W. FOSTER.

Mandrels for Making Spools.

No. 134,534.  Patented Jan. 7, 1873.

WITNESSES
Geo. H. Stanley
Thos. P. Barnefield

INVENTOR
John W. Foster

UNITED STATES PATENT OFFICE.

JOHN W. FOSTER, OF PAWTUCKET, RHODE ISLAND.

IMPROVEMENT IN MANDRELS FOR MAKING SPOOLS.

Specification forming part of Letters Patent No. 134,534, dated January 7, 1873.

*To all whom it may concern:*

Be it known that I, JOHN W. FOSTER, of Pawtucket, in the county of Providence and State of Rhode Island, have invented Improvements in Mandrels for Making Spools, of which the following is a specification:

My said invention relates to a means for fastening into a spindle an arbor, on which bobbins or spools are turned or made.

In the accompanying drawing, which is hereby made a part of this specification, Figure I shows a spindle, arbor, and spool or bobbin, said arbor being fastened into said spindle by said improved means, and in the manner hereinafter described. Fig. II shows a view of said arbor detached from the spindle aforesaid.

A is the spindle. B is a composition nut turned or screwed onto the tapering end of said spindle A. C shows the arbor, and D the bobbin or spool. E is an elongated mouth, or slit, or mortise in the tapering end of said spindle A for the admission of the end of the arbor C. F F show screw-threads on the surface of said tapering end of the spindle A, by means of which the nut B is turned or screwed onto said tapering end, and thereby clasping the opposite sides of said tapering end firmly around the end of the arbor C. *a a* are elongated superficial teeth on the opposite end of the arbor C, which enter the central perforation of the spool or bobbin D, and which keep said bobbin or spool from turning around on said arbor C. *b b* are flattened sides of that end of the arbor C which enters the elongated mouth or mortise E, and which, by fitting against the corresponding flattened sides of the interior of said mouth or mortise E, prevents said arbor C from turning around in the said mouth of the spindle A. The interior of said mouth or mortise E is circular for rather more than half its depth. The remainder is flattened on its opposite sides in the manner and for the purposes substantially as aforesaid.

The said spindle A being constructed substantially as shown and described, and the said arbor being constructed and prepared substantially as shown and described, and the flattened end of said arbor being placed in the mouth or mortise E of said spindle, it can be held there by and with any degree of firmness or tenacity that may be desired by simply compressing the sides of the tapering end of said spindle through the operation of said nut B. By screwing or turning said nut onto said tapering end of the spindle A this compression of the sides along the inserted end of said arbor is attained, and in a rapid, secure, and easy manner; and when it is desired to remove the arbor from the spindle it may be done in a manner equally as rapid and simple by loosening said nut B.

The said arbor C, excepting the flattening of the sides of the end, as shown and described, is old, and is not claimed as a part of this invention.

The old method is to place the end of the arbor into a plain circular perforation previously made in the center of the end of the spindle, and to hold it there by pressure from a couple of set-screws passed through the side of the spindle, and turned or screwed down upon the end of said arbor. Among the difficulties arising from the old way are the facts that the arbor soon works loose and turns in its socket, and often the shank of the arbor breaks off or twists off, when the bobbins or spools are made from hard wood, or when a hard or knotty place in the wood is struck by the operator.

By the use of my said invention the working loose is easily avoided by tightening the nut B. The turning in the socket is prevented by the flattened sides of the arbor fitting squarely against the flattened sides of the interior of the mouth or mortise E; and the twisting or breaking off of the shank of the arbor is obviated by the great length of the bearing on the arbor obtained by the compression of the entire length or depth of the mouth or mortise E.

Claim.

What I claim as my invention, and desire to secure by Letters Patent, is—

The device, constructed in the manner and used for the purposes substantially as shown and described in the foregoing specification.

JOHN W. FOSTER.

Witnesses:
 GEO. H. STANLEY,
 THOS. P. BARNEFIELD.